Aug. 5, 1930.  G. W. CHATER ET AL  1,772,242
SIGNALING DEVICE FOR VEHICLES
Filed Nov. 14, 1928  2 Sheets-Sheet 2
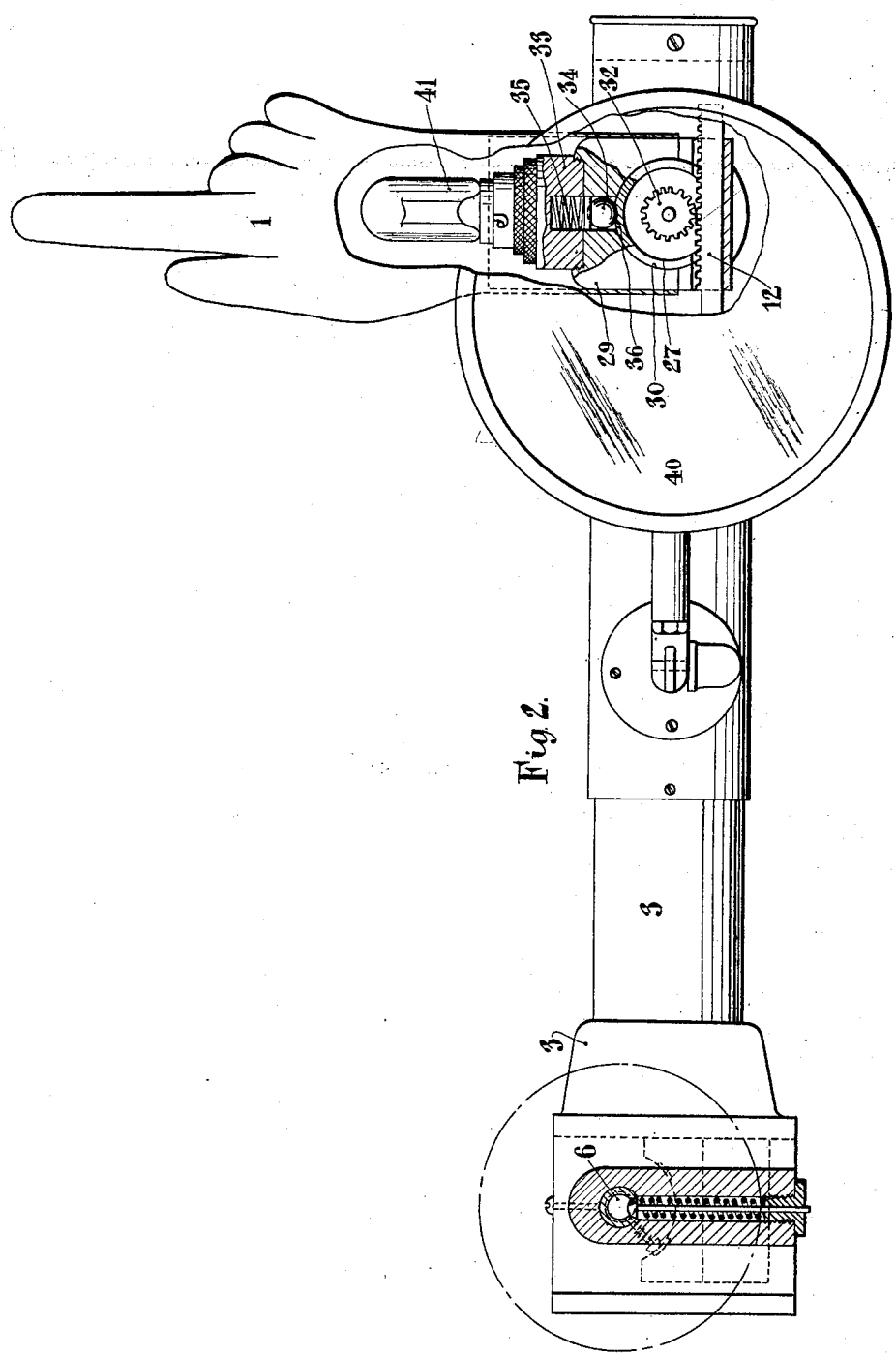

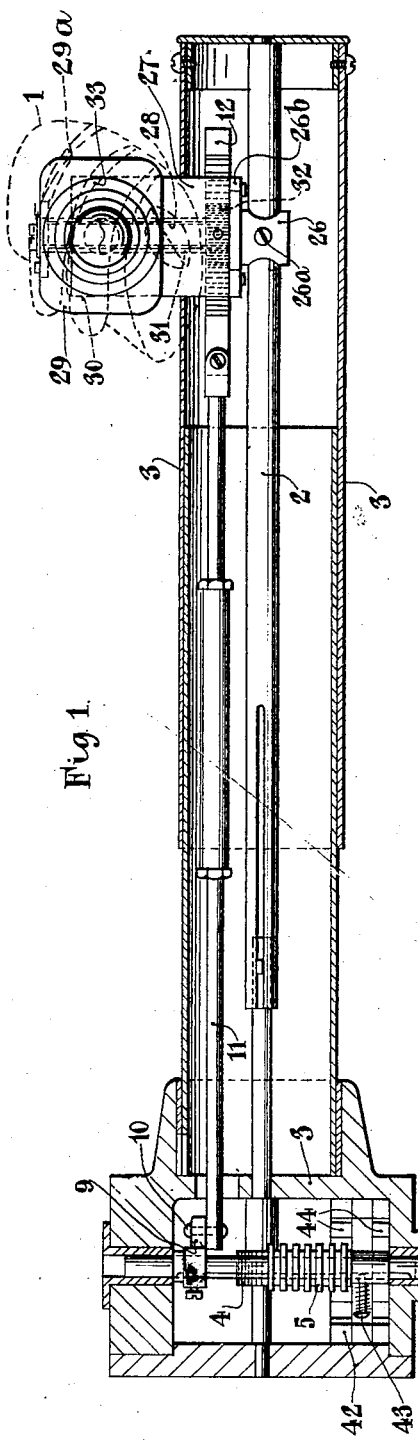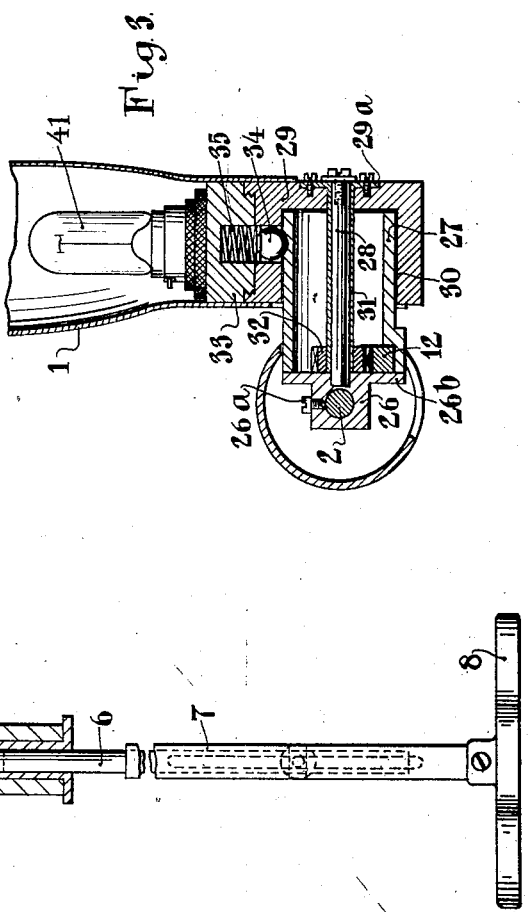

Patented Aug. 5, 1930

1,772,242

UNITED STATES PATENT OFFICE

GEORGE WRIGHT CHATER, OF CHEW MAGNA, NEAR BRISTOL, AND CHARLES WARREN STONES, OF KNOWLE, BRISTOL, ENGLAND

SIGNALING DEVICE FOR VEHICLES

Application filed November 14, 1928, Serial No. 319,314, and in Great Britain November 16, 1927.

This invention relates to indicators for motor cars, and comprises a casing adapted to be fixed to a vehicle, a shaft mounted in the casing adapted to be rotated on its axis, a housing mounted on said shaft, a sleeve in said housing carrying a toothed wheel and an indicator mounted on the sleeve a second shaft in said casing adapted to be moved axially, a rack on said shaft adapted to coact with the toothed wheel on said sleeve, means for rotating said first mentioned shaft and axially moving the second mentioned shaft whereby the indicator is moved back and forth and laterally.

One form of device made according to the present invention is illustrated, by way of example, with reference to the drawings filed herewith, wherein:—

Fig. 1 is a part sectional plan;
Fig. 2 is an elevation, also partly in section; and
Fig. 3 is a detail view.

Referring to the drawings:

The model of a human hand 1 is fixed to a shaft 2 rotatable in bearings in the ends of the casing 3. The shaft 2 carries at one end a toothed wheel 4 adapted to mesh with a rack 5 fixed to a spindle 6 adjustable for length in a hollow casing 7 carrying the operating wheel 8. The end of the spindle 6 remote from the wheel 8 is connected by a short rod 9 and pin 10 to one end of a shaft 11 extending through the casing approximately parallel to the shaft 2; the other end of the shaft 11 is formed with a rack 12. To the shaft 2 is secured a plate 26$^b$ by a collar 26 and screw 26$^a$. On the plate 26$^b$ is mounted a cylindrical member 27. The hand 1 is mounted on a stop 29 which is bored at 30 to receive the cylindrical member or housing 27. The plate 26$^b$ and bearing plate 29$^a$ carry a fixed spindle 28 on which is disposed a sleeve or hollow spindle 31. On the spindle 31 is a pinion 32 adapted to engage the rack 12 which passes through a gap in the cylindrical member 27. On the stop 29 is an extension 33 in which is disposed a spring 35 adapted to press a ball 34 into engagement with a notch 36 in the cylindrical member 27 to hold the hand 1 in its upright or normal position.

Incorporated with the device is an adjustable driving mirror 40 and means for illuminating the hand at night time. In Fig. 2 an electric lamp 41 is shown mounted within the hand 1 which serves to illuminate the hand from within. This lamp is illuminated from the switchboard of the car. A switch 42 is provided for sounding an electrical horn by suitable connections when the wheel 8 is operated. The shaft 6 carries a spring contact 43 adapted when the handle 8 is operated, to abut against contacts 44 on the switch 42 and thereby to sound the electric horn.

It will be noticed that the casing 3, shafts 2 and 11, and operating shaft 6, are all made adjustable for length, so that the device can be fitted to any existing vehicle.

In operation, by pushing the wheel 8 forward the rack 5 rotates the wheel 4 thereby rocking the shaft 2 and causing the hand 1 to move through an angle of 90° from its vertical position, carrying the rack 12 below the shaft 2 which is permitted by loose connections of the joints of the rod 11. This position indicates that the vehicle is going straight ahead. When the vehicle is slowing down the wheel 8 is pulled back to its original, i. e. vertical, position, thereby indicating that the vehicle is about to stop. A waving motion can be imparted to the hand when it is in its forward position by rotating the wheel 8 first in one direction and then in the other direction.

What we claim and desire to secure by Letters Patent is:—

In a direction indicator for motor vehicles, a casing adapted to be fixed to a vehicle, a shaft mounted in the casing adapted to be rotated on its axis, a housing mounted in said shaft, a sleeve in said housing carrying a tooth wheel and an indicator mounted on the sleeve, a second shaft in said casing adapted to be moved axially, a rack on said shaft adapted to coact with the toothed wheel on said sleeve, means for rotating said first mentioned shaft and axially moving the second mentioned shaft whereby the indicator is moved back and forth and laterally substantially as described.

In testimony whereof, we affix our signatures.

GEORGE WRIGHT CHATER.
CHARLES WARREN STONES.